United States Patent [19] [11] 3,739,193
Pryor [45] June 12, 1973

[54] LOGIC CIRCUIT

[75] Inventor: Richard Lee Pryor, Cherry Hill, N.J.

[73] Assignee: RCA Corporation, New York, N.Y.

[22] Filed: Jan. 11, 1971

[21] Appl. No.: 105,546

[52] U.S. Cl. ............... 307/205, 307/251, 307/304, 307/214

[51] Int. Cl. .......................................... H03k 19/08

[58] Field of Search............... 307/205, 221 C, 251, 307/279, 304, 214

[56] References Cited

UNITED STATES PATENTS 3,641,511 2/1972 Cricchi ............................ 307/238
3,573,498 4/1971 Aurons ............................ 307/238
3,601,629 8/1971 Cricchi ............................ 307/205
3,577,166 5/1971 Yung ............................ 307/205
3,493,785 2/1970 Rapp ............................ 307/304
3,431,433 3/1969 Ball et al. ............................ 308/251

*Primary Examiner*—John W. Huckert
*Assistant Examiner*—R. E. Hart
*Attorney*—H. Christofferson

[57] ABSTRACT

A logic circuit using semiconductor devices, especially of the MOS type, incorporating an intermediate circuit wherein information is continuously operated upon by a feedback path and without the necessity of switchable controls in the feedback path.

4 Claims, 3 Drawing Figures

*INVENTOR.*

*Richard L. Pryor*

BY J. Donald Weber, Jr.

*ATTORNEY*

Patented June 12, 1973 3,739,193

2 Sheets-Sheet 2

INVENTOR.
Richard L. Pryor
BY G. Donald Weber, Jr.
ATTORNEY

LOGIC CIRCUIT

BACKGROUND OF THE INVENTION

In the prior art, which is shown and described hereinafter, logic circuits utilizing semiconductors including MOS type frequently require switches in a feedback path. The switches are used so that the feedback path can be selectively interrupted to avoid interreaction between the input signal supplied to the circuit and the feedback signal which is supplied by the circuit. This type of circuit is especially cumbersome when a large number of input signals are multiplexed. That is, for each input circuit a switch must be included in the feedback loop so that the feedback loop is interrupted while the input signal is supplied. In the process of manufacturing integrated circuits, such as LSI monolithic structures and the like, the requirement of a switch in the feedback path for each input circuit obviously dictates that a large portion of the circuit area is incorporated into the feedback switches. Thus, inefficient utilization of the circuit or chip area is provided.

In U.S. Pat. No. 3,493,786 entitled "Unbalanced Memory Cell," of R.W. Ahrons et al. assigned to the common assignee, there is described a memory circuit. While the aforesaid patent is directed to a memory device, a similar circuit structure can be utilized in the logic circuit applications described hereinafter. By applying the techniques disclosed in the patent in the manner suggested hereinafter, the disadvantages of the techniques known in the prior art are avoided.

SUMMARY OF THE INVENTION

The subject invention relates to a logic circuit which can be utilized in a large scale multiplexing scheme. A plurality of circuits are connected together to perform a suitable logic function. These circuits are connected to a suitable utilization device by means of a coupling network. A feedback network connected around the coupling network permits the coupling network to be maintained in the condition dictated by the input circuit. Moreover, the feedback circuit is designed to continuously return a portion of the output signal from the coupling circuit to the input thereof. Nevertheless, signals can be supplied to the coupling circuit via the input means without interrupting the feedback network inasmuch as the feedback signal is sufficiently small to be overridden by the input signal.

DESCRIPTION OF THE PREFERRED EMBODIMENT

Figure 1:
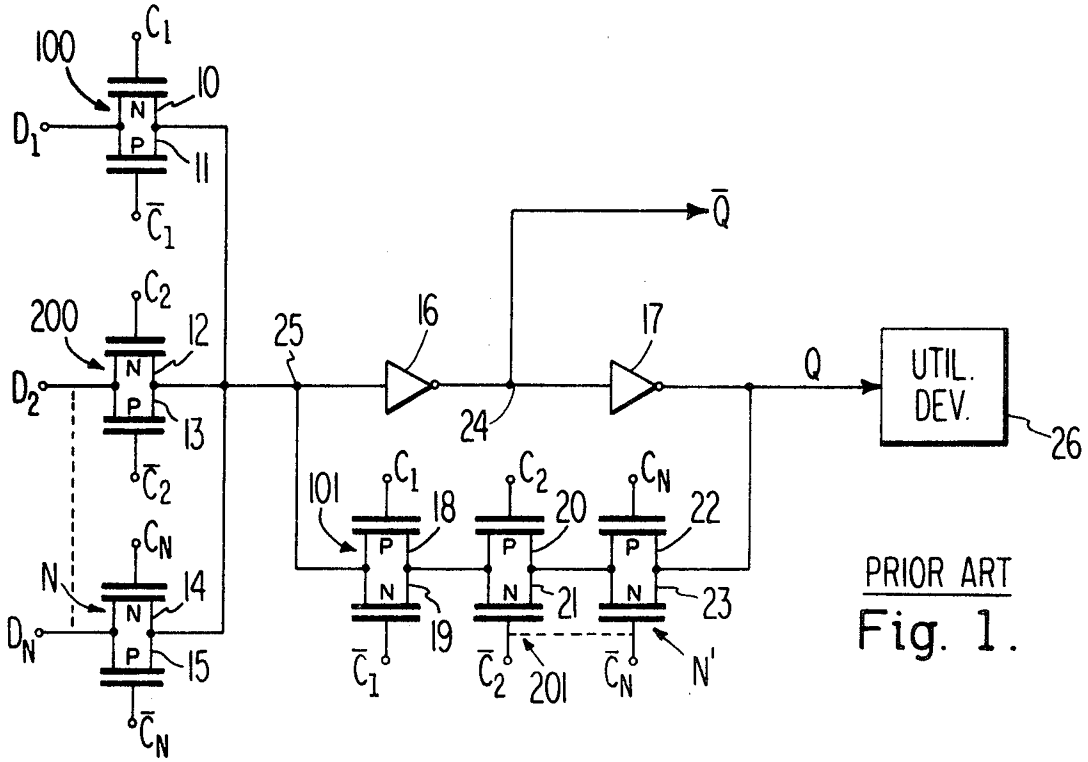
FIG. 1 is a schematic representation of a typical circuit utilized in the prior art.

In the description which follows hereinafter, elements which are similar in the various drawings will be designated by similar reference numerals.

Referring now to FIG. 1, there is shown a schematic diagram of a circuit which is known and used in the prior art. A plurality of inputs D1, D2 . . . Dn are utilized. Each of the inputs is connected via a transmission gate to common junction 25 which is connected to a coupling circuit. In particular, input terminal D1 is connected via gate 100 to common junction 25. Similarly, input terminal D2 is connected to junction 25 via gate 200 and input terminal Dn is connected to junction 25 via gate N. While three inputs and associated gates are shown, the circuit is not limited to this particular number of inputs.

Common junction 25 is connected to the input of inverter 16. The output of inverter 16 is connected to the input of inverter 17. In addition, the $\overline{Q}$ output terminal is connected to common terminal 24 which is connected to the input terminal of inverter 17. The output of inverter 17 is connected to the input of utility device 26 which may be any suitable output device including another stage similar to that shown and described herein. In addition, the output of inverter 17 is connected to common junction 25 via a feedback network comprising a series combination of transmission gates 101, 201 . . . N'. Each of these transmission gates is associated with one of the input transmission gates. Thus, control signals C1 and $\overline{C1}$ are applied to input gate 100 and to feedback gate 101. Similarly, input control signals C2 and $\overline{C2}$ are applied to input gate 200 and feedback gate 201. Control signals Cn and $\overline{Cn}$ are applied to input gate N and feedback gate N'.

Each of the input gates includes complementary MOS devices. The gates each include one N-type device 10, 12 or 14 and one P-type device 11, 13 or 15. Likewise, the feedback gates include P-type devices 18, 20 and 22 and N-type devices 19, 21 and 23. However, the signals supplied to the corresponding input and feedback gates are oppositely connected. For example, the C1 control signal is supplied to the N-type device 10 of input gate 100. Conversely, the C1 control signal is supplied to the P-type device 18 of feedback gate 101. The $\overline{C1}$ control signals are also reversed. Consequently, the application of a control signal which causes transmission gate 100 to be conductive will cause the corresponding feedback gate 101 to be rendered nonconductive. Moreover, the control signals are arranged so that the feedback gates are normally conductive whereby the output signal produced by inverter 17 is normally returned to common junction 25 and the input of inverter 16.

As suggested supra, conduction by a feedback gate implies nonconduction by the associated input gate and vice versa. Thus, when information is desired to be supplied to the circuit via an input gate, the input gate must be rendered conductive. Inherently, the associated feedback gate will be rendered nonconductive. When any one of the feedback gates is nonconductive, the series feedback network is open-circuited and no feedback signal is transmitted.

This type of circuitry is often used in the prior art in order to permit an input signal to be supplied from one of the input terminals to the remainder of the circuit. If the feedback path were not disconnected, the output signal from inverter 17 could, in fact, cause erroneous operation upon the information supplied by an information input source. Obviously, if N is a relatively large number of inputs for this type of circuitry, 2N transmission gates (i.e. both input and feedback gates) is a large number and the area of the circuit or circuit chip is relatively inefficiently utilized.

Figure 2:
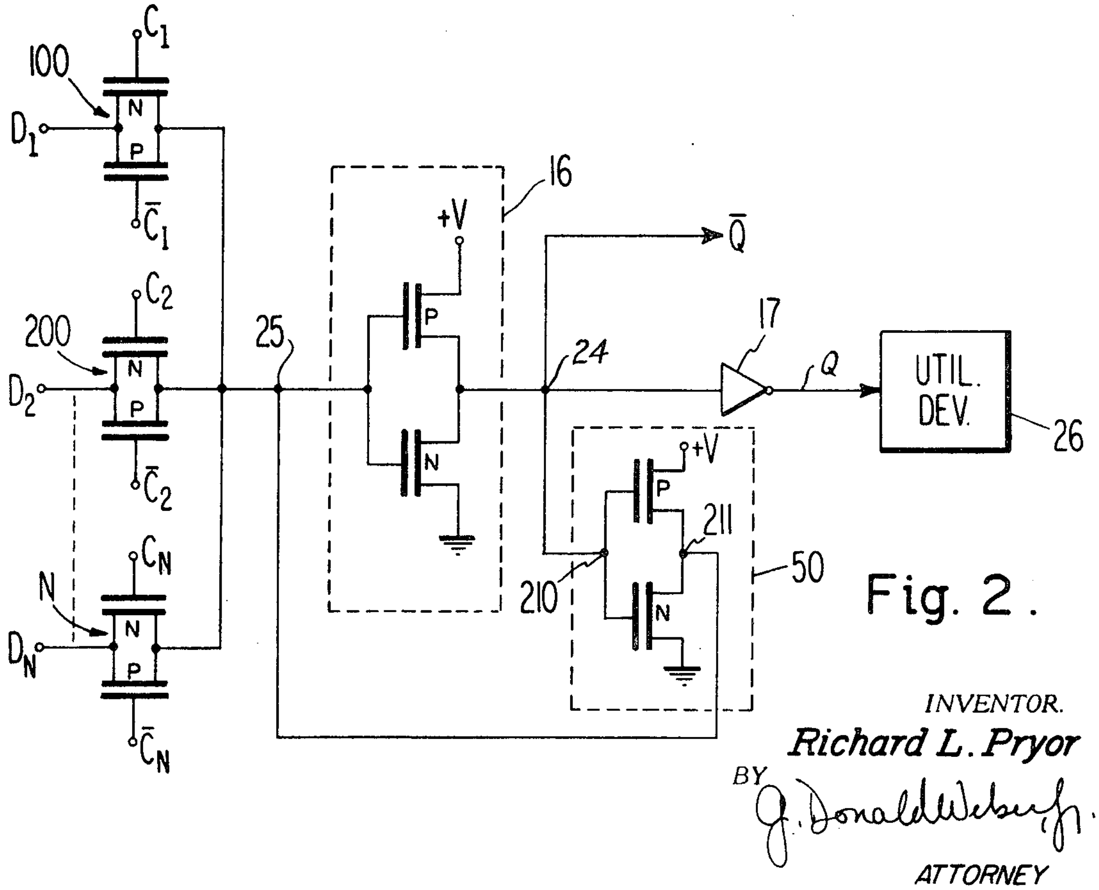
FIG. 2 is a schematic representation of a preferred embodiment of the invention.

Referring now to FIG. 2, there is shown a schematic diagram of one embodiment of the instant invention. In this embodiment, a plurality of N input devices or terminals D1, D2 . . . Dn are connected to a circuit via a plurality of input gates 100, 200 . . . N. Again, each of these gates includes an N-type device and a P-type device connected to receive control signals and complement control signals, respectively. Moreover, the coupling circuit includes inverters 16 and 17 connected in series from the common junction 25 of the input transmission gate network to the utilization device 26. However, the feedback network, instead of including a plurality of transmission gates comprises inverter 50. Inverter 50 is a CMOS-type inverter utilizing a P-type and an N-type device. In inverter 50, common junction 210 is connected to the control electrodes of both of the P and N devices. Moreover, junction 210 is connected common junction 24 between inverters 16 and 17. Common junction 211, the common junction of the conduction paths of the P and N devices of inverter 50, is connected to common junction 25 at the input of inverter 16. The series connected conduction paths of the P and N-type devices are connected across a suitable potential source.

Inverters 16 and 17 are CMOS inverters such as are utilized in the prior art as shown in FIG. 1. However, inverter 50 is constructed such that the current carrying capabilities thereof are much reduced in respect to the current carrying capabilities of inverter 16. Current carrying capability of inverter 50 is a function of the dimensions and spacing of the several electrodes of the devices therein. In a typical example, although not limited thereto, inverter 50 may conduct current on the order of one-tenth of the current conducted by inverter 16 for the same value input signal. The feedback current can be relatively small inasmuch as the input gates, when not conducting an input signal, provide extremely high impedance isolation from the remainder of the circuit. Consequently, since there is little or no leakage in the circuit the relatively small current of inverter 50 is sufficient to maintain the circuit in the condition previously determined by the input signal at junction 25.

Additionally, inasmuch as the feedback current is relatively small compared to the input current, the input signal easily overrides the feedback current signal whereby the feedback network need not be interrupted in order to insert input information into the circuit. Consequently, a single inverter network in the feedback path may be substituted for a plurality N switching gates in the feedback path as often used in the prior art.

Furthermore, since the feedback device is also an inverter, the output signal supplied by inverter 16 is inherently inverted so that the phase relationship between the normal input signal and the feedback signal (at junction 25) is compatible. Consequently, there is greater independence between the feedback signal and the utilization device 26 inasmuch as inverter 17 is interposed therebetween. In the prior art described above, the feedback signal is not so isolated.

Figure 3:
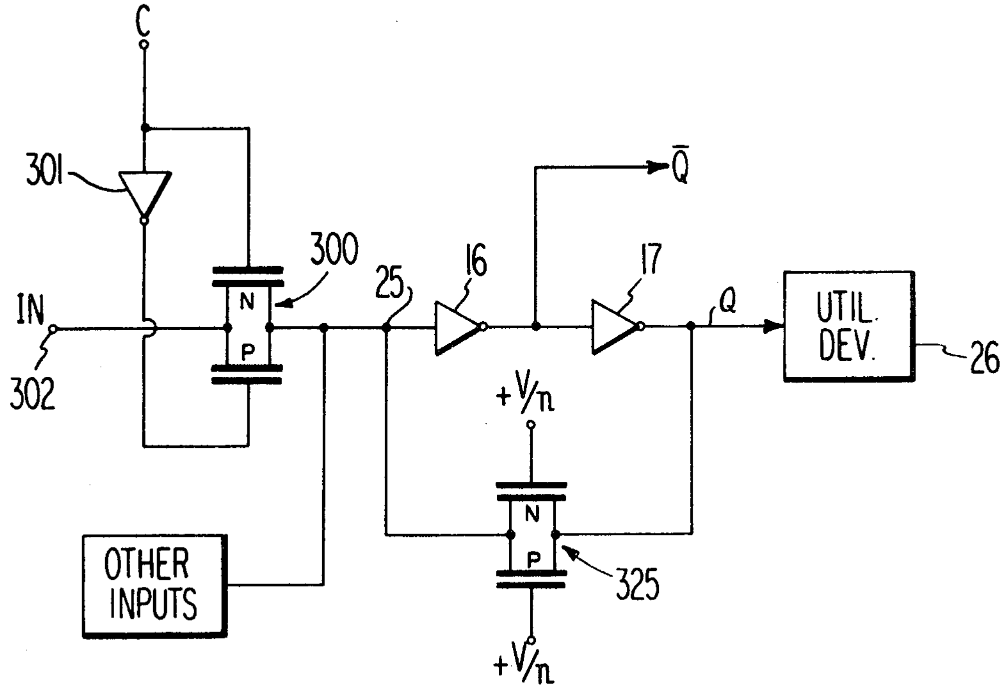
FIG. 3 is a schematic representation of another embodiment of the instant invention.

Referring now to FIG. 3, there is shown a schematic diagram of another embodiment of the instant invention. In this embodiment, input terminal 302 (of which a plurality may be employed) is connected to junction 25 via a suitable complementary transmission gate 300. Input gate 300 includes an N-type device and a P-type device. The conduction paths of the N and P-type devices are connected in parallel to each other between the input terminal 302 and common junction 25. The control electrode of one of the devices, in this case the N-type device, is connected to receive the control signal C. The control electrode of the other device is connected via inverter 301 to the C control signal source whereby the complement signal is supplied to the aforesaid control electrode.

Common junction 25 is connected to one input of inverter 16. The output of inverter 16 is connected to an input of inverter 17 as well as to the Q output terminal. The output of inverter 17 is connected to a suitable utilization device 26 to supply the output signal Q thereto. In addition, the output of inverter 17 is connected via complementary transmission gate 325 to common junction 25 at the input of inverter 16. Complementary gate 325 includes an N-type device and a P-type device having the conduction paths thereof connected in parallel. The control electrodes of the P-type device as well as the N-type device are connected to a suitable source. In this example the source provides a potential of V/n, where V is the potential supplied to the inverters and n is a suitable divisor. Thus, gate 325 is biased to a less conductive condition than would normally occur if a full biasing potential V were applied. Since gate 325 is so biased, only a portion of the signal at the output of inverter 17 is fed back to the input of inverter 16 at common junction 25. Thus, gate 325 continuously feeds back a relatively small portion of the output signal to maintain the coupling network (inverters 16 and 17) in a prescribed condition. However, since the feedback signal is relatively small, it is relatively easily overridden by the application of an input signal via gate 300 or the counterpart thereof in plural input circuit configuration.

The reduced feedback signal can also be produced by constructing gate 325 in such a manner that the impedance thereof is relatively high. In this case, the control electrode of the N-type device would be connected to a source +V while the control electrode of the P-type device would be connected to ground potential. However, the high impedance gate would have reduced current carrying capabilities (compared to inverters 16 and 17) as desired.

Thus, there has been shown and described a circuit (e.g. a logic circuit) which includes a suitable coupling network and a single, continuously operable feedback network (relative to the coupling network). The coupling network, when isolated from the input sources, is maintained in a prescribed condition by the feedback network but is readily adaptable to operate upon input signals when supplied thereto. It will be readily apparent to those skilled in the art that certain modifications can be made to the specific circuit. For example, the polarities of the signals and/or the devices may be reversed or otherwise altered in order to effect any desirable circuit configuration. Furthermore, several logic function operations can be defined for this circuit. Any of these modifications, within the purview of this invention, are intended to be included within the description.

What is claimed is:

1. A circuit responsive to a plurality of input signals comprising:
   an input terminal,
   an output terminal,
   a plurality of input switches each connected at one end to said input terminal and receptive to an input signal at the other end, each switch being controllable so that an input signal is either coupled to or decoupled from the input terminal, coupling means connected between said input terminal and said output terminal and being set to a condition in accordance with an input signal when an input signal is coupled to said input terminal, and a transmission gate having a conduction path connected between the input terminal and the output terminal and having a control electrode for controlling the conduction of the conduction path connected to a source of fixed potential to render said conduction path continuously conductive of a positive feedback signal to said input terminal of a magnitude sufficient to hold said coupling means in the last previously set condition, when all the input signals are decoupled from said input terminal, and small enough to be overridden by an input signal, so that the coupling means is set to a condition in accordance with the input signal.

2. The circuit recited in claim 1 wherein said coupling means includes a pair of cascaded inverter circuits.

3. The circuit recited in claim 1 wherein said transmission gate comprises a pair of semiconductor devices of opposite conductivity types having the conduction paths thereof connected in parallel.

4. The circuit recited in claim 1 wherein each of said input switches includes a transmission gate comprising a pair of semiconductor devices of opposite conductivity types having the conduction paths thereof connected in parallel and having control electrodes for controlling the conduction characteristics of the conduction paths of said semiconductors.

* * * * *